United States Patent Office 3,225,047
Patented Dec. 21, 1965

3,225,047
N,N′-BIS(PYRIMIDINE-5-ACETYL)ETHYLENE DIAMINES
Richard A. Partyka, Syracuse, N.Y., assignor to Bristol-Myers Company, New York, N.Y., a corporation of Delaware
No Drawing. Filed Feb. 24, 1964, Ser. No. 347,054
3 Claims. (Cl. 260—256.4)

This invention relates to novel antibody suppressants. More particularly, this invention relates to certain N,N′-bis-(substituted pyrimidine-5-acetyl)ethylene diamines.

Immunologic competence is responsible for specificity of host resistance to many environmental and physiological stresses. Antigen-antibody reaction determine the specific response of the organism to a non-specific challenge. For example, allergic, hypersensitivity responses to antigenic materials and tissue transplant rejection result from such reactions. Drugs which suppress antibody formation in animals, including man, are useful in helping to prevent the adverse effects caused by such reactions.

It is an object of this invention to provide a new class of therapeutic compounds. It is another object of this invention to provide novel compounds which are valuable antibody suppressants.

These objects have been attained by the practice of this invention which, briefly, comprises providing a compound selected from the group consisting of compounds having the general formula

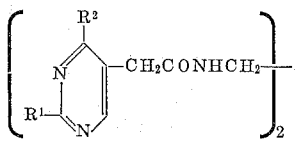

wherein $R^1$ and $R^2$ are each members selected from the group consisting of hydrogen, (lower)alkyl, aryl, hydroxy, (lower)alkoxy, mercapto, (lower)alkylmercapto, amino, (lower)alkylamino, di-(lower)alkylamino and aryl(lower)alkyl; and nontoxic salts thereof. Examples of nontoxic salts include their acid addition salts with inorganic or organic acids, such as hydrochloric acid, hydrobromic acid, hydriodic acid, sulfuric acid, phosphoric acid, maleic acid, acetic acid, citric acid, oxalic acid, succinic acid, benzoic acid, tartaric acid, phthalic acid, picric acid, fumarc acd, etc., and ther quaternary salts.

The term "(lower)" as used herein means both straight and branched chain aliphatic hydrocarbon radicals having from 1 to 10 carbon atoms, such as methyl, ethyl, propyl, isopropyl, isobutyl, t-butyl, hexyl, heptyl, decyl, etc.

The compounds of this invention are valuable antibody suppressants. Thus, they are effective in preventing the adverse effects caused by the reaction of antibodies with antigens and are therefore useful, for example, in preventing allergic reactions and in preventing the tendency of an animal to reject foreign tissue transplants. Moreover, some of the compounds of this invention possess antibiotic activity. The compounds of this invention may be administered to animals orally or parenterally.

The compounds of this invention may be prepared by reacting ethylene diamine with a compound having the general formula

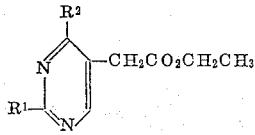

in which $R^1$ and $R^2$ are as defined above. The reaction mixture is preferably heated to hasten the reaction. The reaction may be conducted under a protective atmosphere, such as nitrogen, although this is not absolutely necessary. The crude product may be purified by recrystallization according to conventional techniques.

The reactants from which the compounds of this invention may be prepared are either commercially available or are known compounds or are readily synthesized by methods well known in the art, illustrated in the following examples. Thus, ethyl 2,6-dihydroxy-4-methylpyrimidine-5-acetate and similar compounds may be prepared and converted to the corresponding chloro-pyrimidines by the procedure described by T. B. Johnson and F. W. Heyl, Am. Chem. J., 38, 659 (1907).

The following examples illustrate the best modes contemplated for carrying out this invention.

EXAMPLE 1

Part A.—A mixture of ethyl 2,6-dihydroxy-4-methylpyrimidine-5-acetate (53.2 g.; 0.25 mole) and 340 ml. of phosphorous oxychloride in 55 ml. of N,N′-diethylaniline is prepared. The mixture is heated at reflux for 40 minutes to complete solution, and the excess phosphorous oxychloride is removed under reduced pressure. The remaining solution is poured onto 150 g. of ice whereby a solid product is formed. The solid product is extracted into 200 ml. of ether and separated from the aqueous layer. The ether extract is washed twice with 200 ml. portions of a saturated NaCl solution and dried over anhydrous sodium sulfate. It is then filtered and the solvent is removed from the filtrate. A solid is thereby obtained which is recrystallized from Skellysolve B. The product, ethyl 2,6-dichloro-4-methylpyrimidine - 5 - acetate (55.0 g.; 88.2% of theoretical yield), is found to have a melting point of 52–53° C.

Analysis—Calcd. for $C_9H_{10}N_2O_2Cl_2$: C, 43.39%; H, 4.05%; N, 11.25%; Cl, 28.47%. Found: C, 43.64%; H, 4.20%; N, 11.30%; Cl, 28.38%.

Part B.—A solution of ethyl 2,6-dichloro-4-methylpyrimidine-5-acetate (25.0 g.; 0.1 mole) in 200 ml. of absolute alcohol is charged with 32 ml. (23.1 g.; 0.23 mole) of triethylamine and 3 g. of 5% palladium on carbon. After two hours, an additional 3 g. of 5% palladium on carbon in 25 ml. of absolute alcohol is added. After another hour, the mixture is filtered through Celite and the alcohol is removed from the filtrate under reduced pressure. The residue is extracted with several portions of ether, and the combined ether extracts are filtered. The filtrate is stripped of solvent and the resulting residue is distilled under reduced pressure. The product, ethyl 4-methylpyrimidine-5-acetate (15.7 g.; 87.2% of theoretical yield), is found to have a boiling point of 132–134° C. at a pressure of 10 mm. mercury.

Analysis.—Calcd. for $C_9H_{12}N_2O_2$: C, 59.98%; H, 6.71%; N, 15.55%. Found: C, 59.14%; H, 6.64%; N, 15.23%.

Part C.—A solution of ethyl 4-methylpyrimidine-5-acetate (10.7 g.; 0.06 mole) in 20 ml. of ethylene diamine is heated at reflux for 60 hours under an atmosphere of nitrogen. Excess ethylene diamine is removed under reduced pressure and the solution is cooled. Absolute alcohol is then added and the resultant viscous oil partially solidifies. The mixture is filtered and the filter cake is recrystallized from absolute alcohol. The product, N,N′-bis(4-methylpyrimidine-5-acetyl)ethylene diamine (2.0 g.; 20.3% of theoretical yield), has a melting point of 238–241° C.

Analysis.—Calcd. for $C_{16}H_{20}N_6O_2$: C, 58.52%; H, 6.14%; N, 25.60%. Found: C, 58.70%; H, 5.94%; N, 25.90%.

EXAMPLE 2

Part A.—A solution of benzamidine (108.0 g.; 0.90 mole) in ethanol is prepared by adding benzamidine hydrochloride (140.4 g.; 0.90 mole) to 900 ml. of ethanol containing dissolved sodium (20.7 g.; 0.90 mole). The solution is stirred for 10 minutes and filtered to remove the sodium chloride precipitate. There is then added with stirring a solution of diethyl formylsuccinate (179.5 g.; 0.90 mole) in 100 ml. of ethanol. The mixture is refluxed for 18 hours, cooled, and the product, ethyl 2-phenyl-4-hydroxypyrimidine-5-acetate, is recovered by filtration. The product (125 g.; 54% of theoretical yield) is found to have a melting point of 169–175° C.

*Analysis.*—Calcd. for $C_{14}H_{14}N_2O_3$: C, 65.10%; H, 5.46%; N, 10.85%. Found: C, 65.00%; H, 5.51%; N, 10.88%.

*Part B.*—A mixture of phosphorous oxychloride (65 ml.) and ethyl 2-phenyl-4-hydroxypyrimidine-5-acetate (6.5 g.; 0.025 mole) is heated at reflux for 2.5 hours. Excess phosphorous oxychloride is removed under reduced pressure and the residue is poured into ice water which is layered with an ether-benzene mixture in a 1:1 ratio. The layers are separated and the aqueous layer is washed once with ether, and once with benzene. The combined organic layers are then washed with a saturated NaCl aqueous solution, dried over sodium sulfate, and filtered. The filtrate is collected and stripped of solvent. The solid residue, ethyl 2-phenyl-4-chloropyrimidine-5-acetate (6.46 g.; 93.8% of theoretical yield), is recrystallized from Skellysolve B. The product is found to have a melting point of 78–80° C.

*Analysis.*—Calcd. for $C_{14}H_{13}N_2O_2Cl$: C, 60.76%; H, 4.73%; N, 10.13%; Cl, 12.81%. Found: C, 61.00%; H, 4.77%; N, 10.21%; Cl, 12.88%.

*Part C.*—A solution of ethyl 2-phenyl-4-chloropyrimidine-5-acetate (2.78 g.; 0.01 mole) in 100 ml. of ethanol is charged with 1.4 ml. (1.01 g.; 0.01 mole) of diethylaniline and 500 mg. of 5% palladium on carbon. After 15 minutes, hydrogen uptake is completed. The mixture is filtered and the solvent is removed from the filtrate under reduced pressure. The residue is extracted with several portions of benzene and the combined benzene extracts are filtered. The filtrate is stripped of solvent and the product, ethyl 2-phenylpyrimidine-5-acetate (2.2 g.; 91.6% of theoretical yield), is distilled at 125° C. at a pressure of 0.05 mm. of mercury.

*Analysis.*—Calcd. for $C_{14}H_{14}N_2O_2$: C, 69.40%; H, 5.38%; N, 11.56%. Found: C, 69.40%; H, 5.74%; N, 11.79%.

*Part D.*—A solution of sodium hydroxide (1.0 g.; 0.025 mole) and ethyl 2-phenylpyrimidine-5-acetate (2.0 g.; 0.00825 mole) in 50 ml. of water is heated to reflux and allowed to cool to room temperature. The solution is stirred for 12 hours, and filtered. The filtrate is acidified by the addition of 6 N HCl. The crude product, 2-phenylpyrimidine-5-acetic acid (1.45 g.; 82.5% of theoretical yield) is recovered by filtration and recrystallized from 95% ethanol. The product is found to have a melting point of 188–190° C.

*Analysis.*—Calcd. for $C_{12}H_{10}N_2O_2$: C, 67.28%; H, 4.71%; N, 13.08%. Found: C, 67.10%; H, 4.63%; N, 13.22%.

*Part E.*—Ethyl 2-phenylpyrimidine-5-acetate (5.6 g.; 0.023 mole) is heated to 90–95° C. and 0.97 ml. (0.69 g.; 0.0115 mole) of ethylene diamine is added. The mixture is heated to 105° C and maintained at this temperature for 20 hours. After cooling, a hard brown solid is formed. This solid is triturated with ethyl alcohol and filtered. After drying, the crude product, N,N'-bis(2-phenylpyrimidine-5-acetyl)ethylene diamine, is obtained in 90.4% of theoretical yield (4.7 g.). The crude product is recrystallized from a mixture of water and N,N'-dimethylacetamide. The resultant white crystalline material has a melting point of 301–303° C.

*Analysis.*—Calcd. for $C_{26}H_{24}N_6O_2$: C, 69.01%; H, 5.35%; N, 18.57%. Found: C, 69.10%; H, 5.42%; N, 18.60%.

EXAMPLE 3

N,N' - bis(4-methylpyrimidine - 5 - acetyl)ethylene diamine (0.001 mole) and succinic acid (0.001 mole) are mixed together in 5 ml. of water. The mixture is heated to 80° C. for several minutes and cooled. The water is then removed by freeze drying whereby the product, the succinic acid salt of N,N'-bis(4-methylpyrimidine-5-acetyl)ethylene diamine, is recovered.

EXAMPLE 4

In the process of Part E of Example 2, when the ethyl 2-phenylpyrimidine-5-acetate is replaced with 0.023 mole of ethyl 2-propylpyrimidine-5-acetate, ethyl 2-hydroxypyrimidine-5-acetate, ethyl 2-methoxypyrimidine-5-acetate, ethyl 2-benzyloxypyrimidine-5-acetate, ethyl 2-aminopyrimidine-5-acetate, ethyl 2-dimethylaminopyrimidene-5-acetate, ethyl 2-mercaptopyrimidine-5-acetate, ethyl 2-ethylmercaptopyrimidine-5-acetate and ethyl 2-benzylpyrimidine-5-acetate, respectively, there are obtained, instead of N,N' - bis(2-phenylpyrimidine-5-acetyl)ethylene diamine as the final product, the corresponding N,N'-bis(2-propylpyrimidine-5-acetyl)ethylene diamine, N,N'-bis(2-hydroxypyrimidine-5-acetyl)-ethylene diamine, N,N'-bis(2-methoxypyrimidine-5-acetyl)ethylene diamine, N,N'-bis(2-benzyloxypyrimidine-5-acetyl)ethylene diamine, N,N'-bis(2-aminopyrimidine-5-acetyl)ethylene diamine, N,N'-bis(2-dimethylaminopyrimidine - 5 - acetyl)ethylene diamine, N,N' - bis(2 - mercaptopyrimidine - 5-acetyl)ethylene diamine, N,N'-bis(2-ethylmercaptopyrimidine-5-acetyl)ethylene diamine and N,N'-bis(2-benzylpyrimidine-5-acetyl) ethylene diamine.

EXAMPLE 5

In the process of Part C of Example 1, when the ethyl 4-methylpyrimidine-5-acetate is replaced with 0.06 mole of ethyl 4-phenylpyrimidine-5-acetate, ethyl 4-hydroxypyrimidine-5-acetate, ethyl 4-ethoxypyrimidine-5-acetate, ethyl 4-mercaptopyrimidine-5-acetate, ethyl 4-methylmercaptopyrimidine-5-acetate, ethyl 4-aminopyrimidine-5-acetate, ethyl 4-methylaminopyrimidine-5-acetate, ethyl 4-benzylpyrimidine-5-acetate, ethyl 2,4-dimethylpyrimidine-5-acetate and ethyl 2-phenyl-4-methylpyrimidine-5-acetate, respectively, there are obtained, instead of N,N'-bis(4-methylpyrimidine-5-acetyl)ethylene diamine as the final product, the corresponding N,N'-bis(4-phenylpyrimidine-5-acetyl)ethylene diamine, N,N'-bis(4-hydroxypyrimidine-5-acetyl)ethylene diamine, N,N'-bis(4-ethoxypyrimidine-5-acetyl)ethylene diamine, N,N'-bis(4-mercaptopyrimidine-5-acetyl)ethylene diamine, N,N'-bis(4-methylmercaptopyrimidine-5-acetyl) ethylene diamine, N,N'-bis(4-aminopyrimidine-5-acetyl)ethylene diamine, N,N'-bis(4-methylaminopyrimidine-4-acetyl)ethylene diamine, N,N'-bis(4-benzylpyrimidine-5-acetyl)ethylene diamine, N,N'-bis(2, 4-dimethylpyrimidine-5-acetyl)ethylene diamine and N,N'-bis(2 - phenyl - 4 - methylpyrimidine - 5 - acetyl)ethylene diamine.

I claim:
1. A compound selected from the group consisting of compounds of the formula

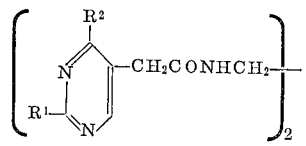

wherein $R^1$ and $R^2$ are each members selected from the group consisting of hydrogen, (lower)alkyl, phenyl, hydroxy, (lower)alkoxy, mercapto, (lower)alkylmercapto, amino, (lower)alkylamino, di(lower)alkylamino, and benzyl and nontoxic pharmaceutically acceptable and addition salts thereof.

2. N,N' - bis(4-methylpyrimidine-5-acetyl)ethylene diamine.

3. N,N' - bis(2-phenylpyrimidine-5-acetyl)ethylene diamine.

References Cited by the Applicant
UNITED STATES PATENTS 2,937,284    5/1960    Hitchings et al.
3,037,980    6/1962    Hitchings et al.

FOREIGN PATENTS 812,366    4/1959    Great Britain.

OTHER REFERENCES

Andersag, H., and K. Westphal: Ber. 70, 2035–54 (1937).

Davoll, J.: J. Chem. Soc., 131–138 (1960).
Foldi, Z., et al.: Ber. 75, 755–763 (1942).
T. B. Johnson and E. F. Kohmann: Am. Chem. J., 49, 184–197 (1931).
Nesbitt, P., and P. Sykes: J. Chem. Soc., 3057–3062.
Smith, V. H., and B. E. Christensen: J. Org. Chem. 20, 829–838 (1955).
R. A. West and L. Beauchamp: J. Org. Chem. 26, 3809–3812 (1954).
R. A. West: J. Org. Chem. 26, 4959–4961 (1961).

NICHOLAS S. RIZZO, *Primary Examiner.*

HENRY R. JILES, MARY U. O'BRIEN,
*Assistant Examiners.*